May 1, 1923.
F. J. VONDERHARR
END GATE
Filed Feb. 15, 1922
1,454,003
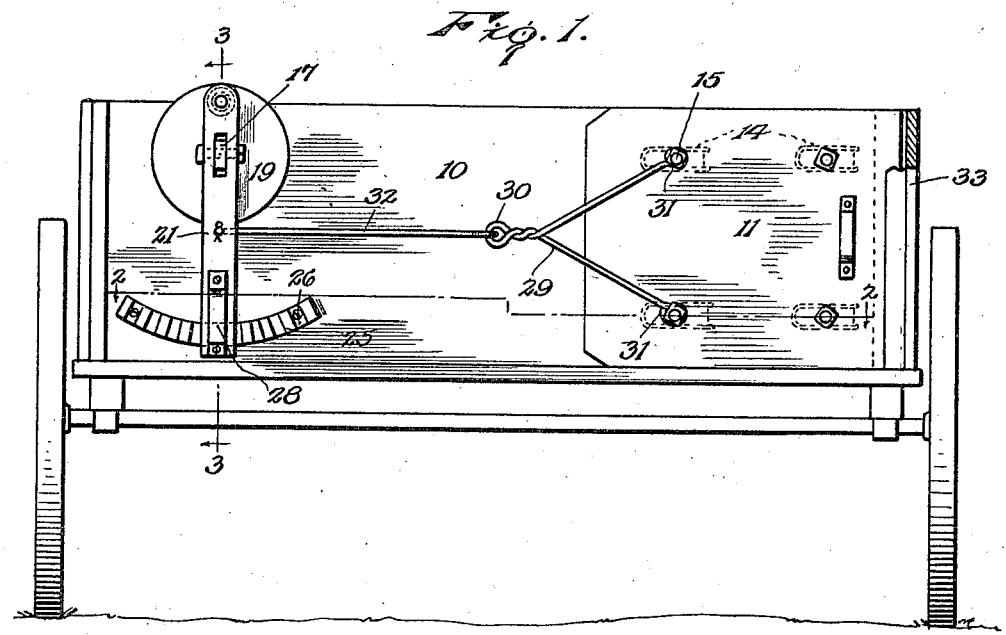
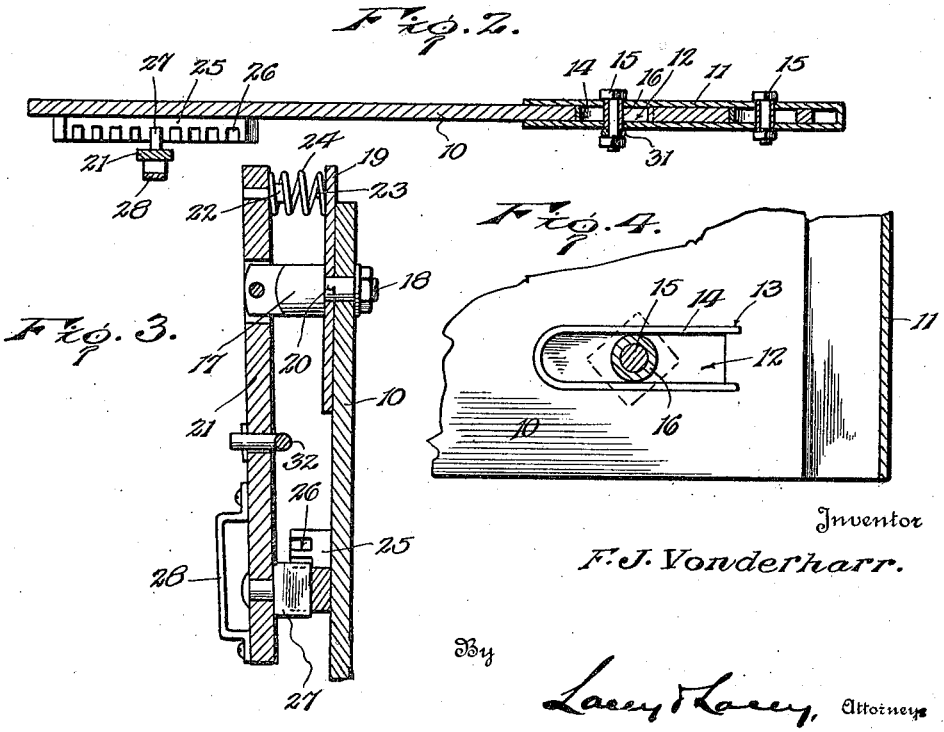
Inventor
F. J. Vonderharr.
By Lacey & Lacey, Attorneys Patented May 1, 1923.

1,454,003

UNITED STATES PATENT OFFICE.

FRANK J. VONDERHARR, OF GRANVILLE, IOWA.

END GATE.

Application filed February 15, 1922. Serial No. 536,727.

*To all whom it may concern:*

Be it known that I, FRANK J. VONDERHARR, citizen of the United States, residing at Granville, in the county of Sioux and State of Iowa, have invented certain new and useful Improvements in End Gates, of which the following is a specification.

This invention relates to an improved end gate for wagons and seeks, as one of its principal objects, to provide an end gate which may be locked in position while, at the same time, the end gate may be readily removed.

The invention has as a further object to provide an end gate which will not become displaced accidentally.

And the invention has as a still further object to provide an end gate embodying a combined lever and latch operable for extending the end gate in active position and locking the end gate extended.

Other and incidental objects will appear hereinafter.

In the drawing:

Figure 1 is an elevation showing my improved end gate in connection with a conventional farm wagon, Figure 2 is a horizontal sectional view on the line 2—2 of Figure 1, looking in the direction of the arrows, Figure 3 is a vertical sectional view on the line 3—3 of Figure 1, looking in the direction of the arrows, and Figure 4 is a fragmentary sectional view showing the mounting of the extension plate of the end gate.

In carrying the invention into effect, I employ a gate body 10 upon one end of which is mounted an extension plate 11, the body 10 forming one section of the end gate and the plate 11 the other section thereof. The plate 11 is preferably formed from a piece of suitable resilient sheet metal bent into substantially U-shape to freely embrace the adjacent end of the body 10 and formed in the body is a plurality of longitudinally directed slots 12. At their outer ends, these slots are, as shown in detail in Figure 4, formed with longitudinally directed notches 13 and engaging at their ends in said notches are U-shaped liners 14 overlying the side walls of the slots. The liners 14 are, like the plate 11, also each formed from a piece of suitable sheet metal and extending through the slots and through the sides of said plate are bolts 15 slidably connecting the plate with the gate body. Surrounding these bolts, as shown in Figures 2 and 4, are spacing sleeves 16 designed to prevent cramping of the sides of the plate and, as will be observed, the liners 14 will coact with said sleeves to prevent wear upon the side walls of the slots.

Mounted upon the gate body near the end thereof opposite the plate 11, is a post 17 provided at its inner end with a stud 18 journaled through the gate body and surrounding said stud is a wear plate 19 lying between the shoulder at the base of the stud and the adjacent face of the body. At the base thereof, the stud is formed with a squared portion 20 snugly fitting through the plate so that the plate will thus be turned with the post and pivoted upon the post is a combined lever and latch 21. Secured to the adjacent end of the lever is a centering stud 22. A similar stud 23 rises from the plate 19 and extending between said plate and the lever is a spring 24 held by said studs. As will be perceived, the plate 19 not only provides a wear plate for the post 17 but also provides a means for supporting the spring 24 to revolve with the post when the lever 21 is swung. Mounted upon the gate body 10 below the post is a segment 25 in which is a series of spaced notches 26 and mounted upon the lever 21 at its inner side is a block or tooth 27 selectively engageable in said notches. At its outer side, the lever carries a handle 28 at its free end so that the lever may be readily swung and it is now to be observed that the spring 24 will act upon the lever for yieldably holding the tooth 27 to coact with the segment 25. Connected with the extension plate 11 at the outer side of the gate body is a bail 29 twisted to provide an eye 30 while at its ends the bail is bent to form eyes 31 through which the innermost pair of bolts 15 are engaged. Connected at one end with the eye 30 of the bail is a rod 32, the opposite end of which is pivotally engaged with the lever 21 for operatively connecting said lever with the plate 11.

In Figure 1 of the drawing, I have shown my improved end gate in connection with a conventional farm wagon 33 and, as will now be readily understood in view of the preceding description, the handle 28 of the lever may be grasped when the lever may be rocked to disengage the tooth 27 thereof from the segment 25 and the lever then swung for retracting the plate 11 over the gate body 10. This done, the end gate may, of course, be readily removed or replaced. When so replaced, the lever 21 is swung in the opposite direction to extend the plate 11 so that the end gate will be caused to bind between the sides of the wagon body when, by releasing the lever, the spring 24 will act thereon to engage the tooth 27 with the segment 25 for locking the end gate in position. I accordingly provide a highly effective construction for the purpose set forth and, as will now be perceived, an end gate adapted for a wide range of use.

Having thus described the invention, what is claimed as new is:

1. An end gate including slidably connected sections, a pivoted swinging lever upon one of the sections operatively connected to another of said sections and swingingly movable in one plane for sliding the latter section, and locking means upon the lever, the lever being pivotally movable in another plane to operatively engage said means with the first section for holding the lever against swinging movement.

2. An end gate including slidably connected sections, a pivoted swinging lever upon one of the sections operatively connected to another of said sections and swingingly movable for sliding the latter section, locking means upon the lever, the lever being pivotally movable to operatively engage said means with the first section for holding the lever against swinging movement, and yieldable means acting upon the lever normally holding the locking means operatively engaged with the first section.

3. An end gate including slidably connected sections, a post mounted to turn upon one of the sections, and a lever upon the post operatively connected to another of said sections and swingingly movable for sliding the latter section, the lever being provided with locking means and being pivoted upon the post for movement to operatively engage said means with the first section for locking the lever against swinging movement.

4. An end gate including slidably connected sections, a post mounted to turn upon one of the sections, a lever upon the post operatively connected to another of said sections and swingingly movable for sliding the latter section, the lever being provided with locking means and being pivoted upon the post for movement to operatively engage said means with the first section for locking the lever against swinging movement, and a spring acting upon the lever for normally holding the locking means engaged with the first section.

5. An end gate including slidably connected sections, a post mounted to turn on one of the sections, a plate engaged with the post to turn therewith, a lever upon the post operatively connected to another of said sections and swingingly movable for sliding the latter section, the lever being provided with locking means and being pivoted upon the post for movement to operatively engage said means with the first section for securing the lever against swinging movement, and a spring bearing between said plate and the lever normally holding said locking means engaged with the first section.

In testimony whereof I affix my signature.

FRANK J. VONDERHARR. [L. S.]